Patented July 18, 1950

2,515,320

UNITED STATES PATENT OFFICE 2,515,320

PROCESSES FOR THE PRODUCTION OF N-ACYLATED AMINO-SUBSTITUTED CARBOXYLIC ACIDS

Herman Sokol, Hasbrouck Heights, N. J., assignor to Heyden Chemical Corporation, New York, N. Y., a corporation of Delaware No Drawing. Application November 6, 1946, Serial No. 708,196

4 Claims. (Cl. 260—518)

The present invention relates to N-acylated amino-substituted carboxylic acids in which the amino radical is substituted by an acyl radical and to processes for the production of such amide-acid compounds. In one of its more specific aspects, the invention relates to an improved method for converting a mixed amide-anhydride of such an acid to the amide-acid, for example, acetylanthranilic-acetic anhydride to acetylanthranilic acid. In one of its preferred embodiments, the invention relates to the production of N-acetylanthranilic acid by the reaction of N-acetylanthranilic-acetic anhydride with acetic acid to form the desired N-acetylanthranilic acid and acetic anhydride.

The present application is a continuation-in-part of my prior copending application Serial No. 582,408, filed March 12, 1945, which has issued as Patent No. 2,423,569, and which in turn is a continuation-in-part of and substitute for my application Serial No. 540,133, filed August 11, 1944, which application was abandoned.

Heretofore a wide variety of mixed anhydrides of N-acylated amino-substituted carboxylic acids have been prepared. Such a mixed anhydride is N-acetylanthranilic-acetic anhydride, which can be made by reaction of anthranilic acid with a large excess of acetic anhydride and by reaction with ketene. These two reactions are representable as follows:

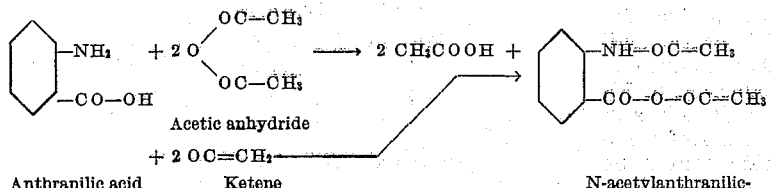

Anthranilic acid    Ketene            N-acetylanthranilic-acetic anhydride

The reactions of ketene with glycine (aminoacetic acid), leucine and anthranilic acid (ortho-aminobenzoic) to produce the corresponding mixed amide-anhydrides are disclosed in Gaylor Patent No. 2,236,125.

Mixed amide-anhydrides are unstable compounds, in most cases disproportionating on standing into the respective symmetrical anhydrides. For example, N-acetylanthranilic-acetic anhydride disproportionates into N-acetylanthranilic anhydride and acetic anhydride. On heating, for example, to temperatures above approximately 100° C., the disproportionation is greatly accelerated and, when distilled at such temperatures, the distillate first appearing consists almost exclusively of the lower-boiling symmetrical anhydride which would be expected from the disproportionation reaction. Some decomposition of the amide group also occurs at higher temperatures and cannot be prevented in most cases.

Mixed amide-anhydrides also react with water and with amines. In converting the mixed amide-anhydride to the amide-acid, by either heating, distillation, water or aniline, considerable hydrolysis of the acyl group attached to the amino substituent of the acid invariably results. Thus, in converting N-acetylanthranilic-acetic anhydride to N-acetylanthranilic acid by means of heating, distillation, or hydrolysis by water, anthranilic acid is formed in substantial quantities.

It is an object of the present invention to provide a process for the production of amide-acids conforming to the general formula:

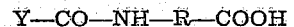

in which Y is an alkyl radical and R is a hydrocarbon radical, which may be either aliphatic or aromatic, from mixed amide-anhydrides conforming to the general formula

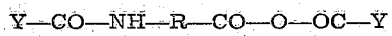

It is a further object of the invention to provide such a process in which there will be no substantial decomposition or hydrolysis so that some replacement of the acyl group joined to the amino radical by a hydrogen radical takes place.

It is a further specific object of the present invention to provide a process for the conversion of mixtures containing N-acetylanthranilic-acetic anhydride, such as are obtained by reactions of anthranilic acid with acetic anhydride and with ketene, to N-acetylanthranilic acid and acetic anhydride, without substantial decomposition or hydrolysis of the compound to form anthranilic acid or other undesirable products.

Other specific objects of this invention are to provide improved processes for the production of N-acylated amino-substituted carboxylic acids such as N-acylated aliphatic and aromatic amino acids, some of which may be used as such or as intermediates for the production of other compounds.

Other objects and advantages of the invention, some of which are referred to specifically hereinafter, will be apparent to those skilled in the art to which the invention pertains.

In accordance with a preferred process for the practice of the invention, acetic acid, preferably glacial acetic acid, is added to N-acetylanthranilic-acetic anhydride, or another of the mixed acetamide-anhydrides specified herein, or a reaction mixture containing such mixed amide-anhydrides, and the resulting mixture is subjected to heating at a temperature between approximately 20° C. or slightly lower and approximately 90° C. or slightly higher. In this heating, the reaction which occurs in the case of N-acetylanthranilic-acetic anhydride and acetic acid may be represented as:

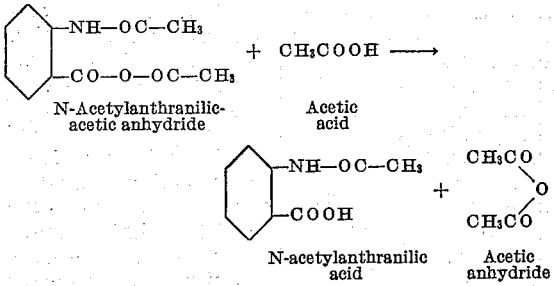

After the heating, the acetic anhydride which is formed is removed from the reaction mixture by distillation, preferably at subatmospheric pressure. The residue which remains may then be subjected to a second treatment with acetic acid, if the conversion of the N-acetylanthranilic-acetic anhydride has not proceeded to the desired extent in the first treatment. The resulting N-acetylanthranilic acid is then recovered and subjected to further conventional purification, if desired.

By means of the above process it is possible to avoid substantial decomposition to anthranilic acid, which would result if the N-acetylanthranilic-acetic anhydride were decomposed by heat or by water to N-acetylanthranilic acid. Furthermore, the acetic anhydride represents a byproduct of considerable value. If water were used for the hydrolysis of the mixed amide-anhydride the byproduct would be the less desirable acetic acid. The process of the invention finds greater usefulness in connection with the production of N-acetylanthranilic acid from anthranilic acid and ketene, in which process the formation of some N-acetylanthranilic acetic anhydride cannot be prevented, rather than in the process of producing N-acetylanthranilic acid from anthranilic acid and acetic anhydride, acetyl chloride or other acetylating agent, in which the acetylation can be controlled so as to yield only N-acetylanthranilic acid. By using the process of the invention, the excess ketene which is consumed in the production of the intermediate N-acetylanthranilic-acetic anhydride is recovered as acetic anhydride.

Although the foregoing description refers particularly to N-acetylanthranilic-acetic anhydride and similar mixed acetamideanhydrides and conversion of such compounds to acetic anhydride and amide-acids by means of acetic acid, the corresponding mixed anhydrides of other acids, particularly mixed anhydrides of aliphatic acids, such as those of propionic, butyric, iso-butyric, pentanoic, hexanoic, dodecanoic, octadecanoic acids and the like, may be used. Such mixed amide-anhydrides may be obtained by reaction of ketene homologues such as methylketene, ethylketene, etc., or corresponding acid anhydrides or acyl chlorides, with amino-substituted carboxylic acids. In the conversion of such mixed amide-anhydrides, the corresponding acid may be used instead of acetic acid to produce the corresponding anhydride as one of the reaction products. Thus, N-propionyl-p-aminobenzoic acid may be obtained by treating N-propionyl-p-aminobenzoicpropionic anhydride with propionic acid. Using the generic formulae hereinabove adopted, the general reaction may be represented as:

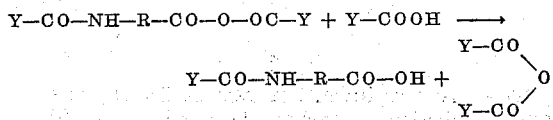

When conducting this reaction the acid which is added for the purpose of effecting the conversion is generally that which corresponds to the lowest-boiling of the two anhydrides which would be expected to form on disproportionation, since it is that anhydride which is distilled off, leaving the amide-acid as residue. These latter may be distilled or purified subsequently in other manners.

Beside the simple amino-substituted aliphatic and aromatic acids (anthranilic and p-aminobenzoic acids, glycine and leucine) referred to above and in the examples, the process of the invention is applicable to the production of a wide variety of other N-acylated amino acids, including N-acyl derivatives of the following acids:

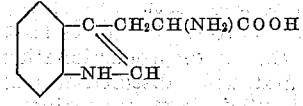

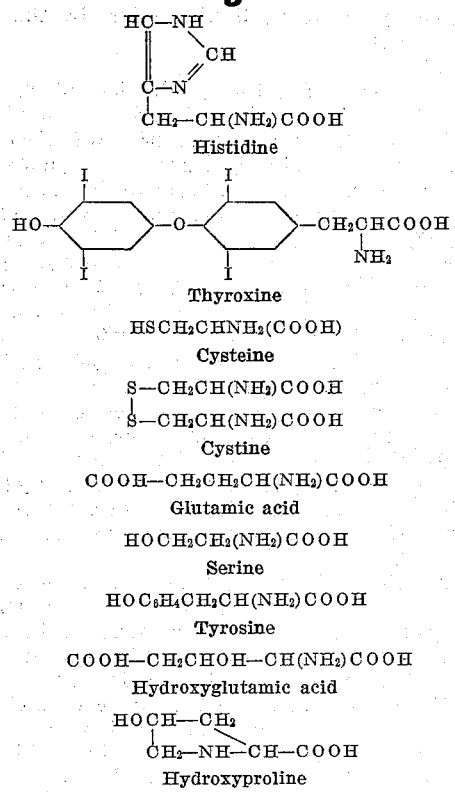

Histidine

Thyroxine

Cysteine

Cystine

Glutamic acid

Serine

Tyrosine

Hydroxyglutamic acid

Hydroxyproline

In connection with some of the foregoing acids which contain other functional groups, namely hydroxyl (—OH) and mercaptyl (—SH) groups, these groups will also be acylated. Reference is respectfully directed to my application Serial No. 582,408 (Patent No. 2,423,569) which is directed specifically to processes of this character. Acylation of all basic nitrogen radicals will result, if the acid, for example, lysine, ornithine and arginine, contains more than one such group.

Although the process is described herein specifically with reference to amino-substituted acids, that is, acids in which the substituent radical is an otherwise unsubstituted —$NH_2$ radical it is obvious that the process is likewise applicable to acids containing such radicals which are further substituted, that is, to imino-substituted acids containing the radical —NH— having one replaceable hydrogen atom and generally to all acids containing basic nitrogen radicals.

The temperatures at which the conversion of the mixed amide-anhydride is effected in accordance with this invention are generally substantially below the boiling point at atmospheric pressure of the anhydride that is formed and at or above room temperature. Thus, in the case of N-acetylanthranilic-acetic anhydride that is treated with acetic acid in accordance with my invention, a preferred temperature is 90° C., and a subatmospheric pressure is used thereafter so that the resulting acetic anhydride may be distilled off at approximately that temperature. The temperatures which are used are substantially below the decomposition point of the mixed amide-anhydride and thereby the danger or possibility of decomposition of the N-acylated amino acid, which is the desired product, is greatly reduced. Furthermore, since no substantial amounts of water are used in the reaction, danger of hydrolysis of the desired products is also substantially obviated.

The process of the present invention is especially applicable to the production of N-acetyl- anthranilic acid from anthranilic acid and ketene and from anthranilic acid and an excess of acetic anhydride or other acetylating agent. When acetylating with ketene, in contradistinction to acetic anhydride, it is difficult to avoid the formation of substantial amounts of N-acetyl-anthranilic-acetic anhydride. The process of the invention is adapted to the treatment of mixtures consisting entirely of N-acetylanthranilic-acetic anhydride as well as to mixtures containing smaller proportions of said compound, such, for example, as mixtures obtained by reaction of anthranilic acid with an excess of acetic anhydride that is insufficient to effect complete conversion to the mixed amide-anhydride.

In the conventional method of producing N-acetylanthranilic acid, the acetylation of anthranilic acid is generally carried to a point short of complete acetylation of all amino radicals since further acetylation would result in the substitution of acetyl radicals into the carboxyl group with the formation of N-acetylanthranilic-acetic anhydride. This is undesirable because, when treated with water, the excess acetic anhydride which was used is converted to acetic acid and represents a loss of acetic anhydride in the process. As a result, in the conventional method, the yields are lower, and the concentration of acetylating agent, the reaction temperatures and periods which are used must be more carefully controlled than in the process in which N-acetylanthranilic acid is produced by reaction of anthranilic acid with an excess of acetic anhydride or with ketene. As hereinabove stated, the reaction of ketene with anthranilic acid proceeds directly to produce N-acetylanthranilic-acetic anhydride rather than stepwise to produce first N-acetylanthranilic acid and then N-acetylanthranilic-acetic anhydride. Furthermore, the process in which N-acetylanthranilic-acetic anhydride is formed requires no recovery and recycling of unreacted anthranilic acid from the reaction product, which is a difficult and expensive procedure. In the production of N-acetylanthranilic acid by the combination of processes for the production of N-acetylanthranilic-acetic anhydride, either solely or only as a portion of the reaction product, together with the conversion of the N-acetylanthranilic-acetic anhydride to N-acetylanthranilic acid and acetic anhydride by reaction with substantially anhydrous acetic acid, a product of extremely high purity is obtained in substantially theoretical yields without the necessity for successive crystallization procedures and extensive procedures for the recovery of materials from mother liquors, and the excess acetylating agent which was used to make the N-acetylanthranilic-acetic anhydride is recovered as acetic anhydride rather than as acetic acid.

Preferred methods of practicing the general process of my invention are illustrated in the specific examples which follow:

*Example 1.—N-acetylanthranilic acid*

N-acetylanthranilic-acetic anhydride was prepared by dissolving 137 g. (approximately 1 mole) of anthranilic acid in 500 ml. of anhydrous ether and this solution was saturated with ketene until slightly more than 84 g. (approximately 2 moles) of ketene were absorbed. The ether was evaporated from the solution on a water bath at 50°–60° C. and there remained the single reaction product, N-acetylanthranilic-acetic anhydride, in the form of a viscous oil. The oil thus obtained was treated with 240 g. (approximately 4 moles) of glacial acetic acid and the mixture was agitated at 90° C. for 2 hours. The mixture was then subjected to a reduced pressure of 20 mm. of mercury with a maximum bath temperature of 90° C. and the acetic acid and acetic anhydride were distilled from the mixture. After stripping until no more distillate was obtained, the solid residue was stirred thoroughly with 100 g. of petroleum ether and filtered. The recovered N-acetylanthranilic acid was dried and weighed 147 g. This represents a yield of 82% of the theoretical.

The petroleum ether was stripped from the filtrate by heating the filtrate on a water bath, and the residual oily mixed anhydride was treated again with a 50 g. portion of glacial acetic acid. The recovered N-acetylanthranilic acid from the second treatment weighed 21 g.

The total recovery of N-acetylanthranilic acid was 168 g., which is 94% of the theoretical. The distillates from the above operations contained 90 g. of acetic anhydride, which is 88% of the theoretical.

*Example 2.—N-acetylglycine (aceturic acid)*

Aceturic-acetic anhydride was prepared by suspending 75 g. (approximately 1 mole) of glycine in 500 ml. of anhyrous acetone and saturating the mixture with ketene until a homogeneous solution resulted. The acetone was evaporated from the solution on a water bath at 60° to 70° C. and there remained a viscous oil, which was principally aceturic-acetic anhydride. The oil thus obtained was treated with 240 g. (approximately 4 moles) of glacial acetic acid by agitating at 90° C. for 2 hours. This mixture was then subjected to a reduced pressure of 20 mm. of mercury at a bath temperature of 90° C., and the acetic acid and acetic anhydride were rapidly distilled from the mixture to leave a solid residue consisting of approximately 85 to 90% N-acetylglycine (aceturic acid) and unconverted mixed anhydride. The solid was then stirred well with 200 g. of ether and filtered. The recovered solid weighed 99 g. and its melting point (206° C.) and analysis demonstrated it to be pure aceturic acid. A yield of 84.5% was thus obtained.

The ether filtrate was heated on a water bath to evaporate the ether and the residual, oily mixed anhydride was treated as described in Example 1 with 50 g. of glacial acetic acid. The recovered aceturic acid from this second treatment weighed 12 g., which represents a total recovery of 111 g. of aceturic acid, or an overall yield of 95%.

The distillates from the two operations contained 92 g. of acetic anhydride, which is equivalent to 90% of the theoretical amount.

Ketene ($CH_2CO$) may be considered the result of removing one molecule of water from one molecule of acetic acid, and acetic anhydride ($CH_3CO-O-OCCH_3$) may be considered as the result of removing one molecule of water from two molecules of acetic acid. Accordingly, both ketene and acetic anhydride are to be understood by the term "anhydride of acetic acid," as used in this specification.

Inasmuch as the foregoing description comprises preferred embodiments of the invention it is to be understood that the invention is not limited thereto and that conventional alterations and modifications may be made therein without departing substantially from the invention, whose scope is to be limited solely by the appended claims.

I claim:

1. A process for the production of an N-acetylated amino-substituted carboxylic acid selected from the group consisting of N-acetyl glycine, valine, leucine, isoleucine, phenylalanine, methionine, threonine, lysine, ornithine, arginine, norleucine, aspartic acid, citrulline, proline, tryptophane, histidine, thyroxine, cysteine, cystine, glutamic acid, serine, tyrosine, anthranilic acid and para-aminobenzoic acid, which comprises the reaction of a mixed anhydride of the N-acetyl amino-substituted carboxylic acid and acetic acid with such an amount of substantially anhydrous acetic acid that at least approximately 4 molecular proportions of acetic acid are present for each molecular proportion of the mixed anhydride, whereby the N-acetyl amino-substituted carboxylic acid and acetic anhydride are formed, and subsequently recovering the resulting N-acetyl amino-substituted carboxylic acid.

2. A process for the production of N-acetylanthranilic acid which comprises the reaction of N-acetylanthranilic-acetic anhydride with substantially anhydrous acetic acid in such amount that at least approximately 4 molecular proportions of acetic acid are present for each molecular proportion of N-acetylanthranilic-acetic anhydride, whereby N-acetylanthranilic acid and acetic anhydride are formed, and subsequently recovering the resulting N-acetylanthranilic acid.

3. A process for the production of N-acetylglycine which comprises the reaction of N-acetylglycine-acetic anhydride with substantially anhydrous acetic acid in such amount that at least approximately 4 molecular proportions of acetic acid are present for each molecular proportion of N-acetylglycine-acetic anhydride, whereby N-acetylglycine and acetic anhydride are formed, and subsequently recovering the resulting N-acetylglycine.

4. A method of producing N-acetylanthranilic acid, which comprises reacting N-acetylanthranilic-acetic anhydride with substantially anhydrous acetic acid in a ratio of approximately 1 mole of N-acetylanthranilic-acetic anhydride to 4 moles of acetic acid at approximately 90° C. for approximately 2 hours, and subsequently recovering the resulting N-acetylanthranilic acid.

HERMAN SOKOL.

REFERENCES CITED

The following references are of record in the file of this patent:

UNITED STATES PATENTS

| Number | Name | Date |
|---|---|---|
| 648,580 | Behal | May 1, 1900 |

FOREIGN PATENTS

| Number | Country | Date |
|---|---|---|
| 19,202 | Great Britain | 1900 |
| 129,000 | Germany | Feb. 25, 1902 |
| 453,577 | Germany | Dec. 10, 1927 |

OTHER REFERENCES

Dakin: "J. Biol. Chem.," vol. 82 (1928), page 443.

Bergmann et al.: "Ber. deut. Chem.," vol. 63 (1930), pages 437–439.

Chattaway: "J. Chem. Soc." (London), 1931, pages 2495–2496.

Herbst et al.: "Organic Syntheses," vol. 19 (1939), pages 4–5.